US012759485B2

(12) United States Patent
Kawashima

(10) Patent No.: US 12,759,485 B2
(45) Date of Patent: Oct. 13, 2026

(54) ABNORMALITY DETERMINATION SYSTEM THAT DETERMINES AN ABNORMALITY OF AN ELECTRONIC CONTROL UNIT

(71) Applicant: TOYOTA JIDOSHA KABUSHIKI KAISHA, Toyota (JP)

(72) Inventor: Satoshi Kawashima, Nisshin (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 93 days.

(21) Appl. No.: 18/751,536

(22) Filed: Jun. 24, 2024

(65) Prior Publication Data

US 2025/0170972 A1 May 29, 2025

(30) Foreign Application Priority Data

Nov. 24, 2023 (JP) ................................ 2023-199312

(51) Int. Cl.
*B60R 16/023* (2006.01)

(52) U.S. Cl.
CPC ................................ *B60R 16/0232* (2013.01)

(58) Field of Classification Search
CPC ................................................ B60R 16/0232
USPC ....................................................... 701/29.2
See application file for complete search history.

(56) References Cited

U.S. PATENT DOCUMENTS

2002/0065169 A1* 5/2002 Suzuki ................... B63H 21/22 477/109
2009/0082909 A1* 3/2009 Sakane .................. H02H 3/087 700/293
2013/0158808 A1* 6/2013 Imamura ................ B62D 5/046 701/42
2018/0251084 A1* 9/2018 Tateishi ................ H02J 7/0031
2019/0066955 A1 2/2019 Shiozaki et al.
2023/0150453 A1* 5/2023 Cohen ................ G07C 9/00571 701/500

FOREIGN PATENT DOCUMENTS

JP 2019-041198 A 3/2019

* cited by examiner

*Primary Examiner* — Abby J Flynn
*Assistant Examiner* — Sean Patrick Reidy
(74) *Attorney, Agent, or Firm* — SoraIP, Inc.

(57) ABSTRACT

An abnormality determination system for determining an abnormality of an electronic control unit mounted on a vehicle, comprising: a plurality of electronic control units; and a control unit connected to the plurality of electronic control units via two or more communication buses, wherein, in a case where an activation request is made via a communication bus during parking of the vehicle, the control unit performs predetermined power supply control on the plurality of electronic control units, measures a current value flowing in the plurality of electronic control units before and after the power supply control, and in a case where there is a specific electronic control unit for changing the current value, stores information of a specific electronic control unit, and in a case where there is no electronic control unit for increasing the current value, stores information of the communication bus that has received the activation request.

5 Claims, 5 Drawing Sheets

ABNORMALITY DETERMINATION SYSTEM THAT DETERMINES AN ABNORMALITY OF AN ELECTRONIC CONTROL UNIT

CROSS-REFERENCE TO RELATED APPLICATION

This application claims priority to Japanese Patent Application No. 2023-199312 filed on Nov. 24, 2023, incorporated herein by reference in its entirety.

BACKGROUND

1. Technical Field

The present disclosure relates to an abnormality determination system that determines an abnormality of an electronic control unit mounted on a vehicle.

2. Description of Related Art

Japanese Unexamined Patent Application Publication No. 2019-041198 (JP 2019-041198 A) discloses a system that detects an abnormality of a plurality of parallel switches that turns on and off power supply to the same load.

SUMMARY

In recent years, illegal access to a vehicle by a malicious third party has been a problem. It is known that such illegal access is performed by illegally communicating with (e.g., hacking) an authorized electronic control unit, or illegally connecting an unauthorized device that performs abnormal operation to a vehicle (e.g., a DLC connector).

However, when an abnormality is caused by unauthorized access, the abnormality cannot be specified if a plurality of switches for supplying power to a plurality of electronic control units is all controlled so as to be turned off, as in JP 2019-041198 A. That is, it is not possible to specify which electronic control unit has an abnormality or which communication path has an abnormality.

The present disclosure has been made in view of the above issue, and an object of the present disclosure is to provide an abnormality determination system capable of specifying an electronic control unit or a communication path in which an abnormality has occurred when an abnormality occurs in a vehicle.

In order to address the above issue, an aspect of the present disclosure provides an abnormality determination system that determines an abnormality of an electronic control unit mounted on a vehicle, the abnormality determination system including: a plurality of electronic control units; and a control unit connected to the electronic control units via two or more communication buses, in which the control unit is configured to, when there is an activation request via a communication bus while the vehicle is parked, perform predetermined power supply control for the electronic control units to measure values of currents that flow through the electronic control units before and after the power supply control, when there is a specific electronic control unit for which a current value is to be changed, store information on the specific electronic control unit, and when there is no electronic control unit for which a current value is to be increased, store information on the communication bus that has received the activation request.

With the abnormality determination system according to the present disclosure, when an abnormality occurs in a vehicle, an electronic control unit or a communication bus in which the abnormality occurs can be specified.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein.

DETAILED DESCRIPTION OF EMBODIMENTS

The abnormality determination system of the present disclosure specifies an electronic control unit or a communication bus in which an abnormality has occurred by controlling the power supply of the electronic control unit to be turned on and off and monitoring a change in current when a request for starting communication is generated while the vehicle is parked.

Hereinafter, an embodiment of the present disclosure will be described in detail with reference to the drawings.

Embodiment

Configuration

Figure 1:
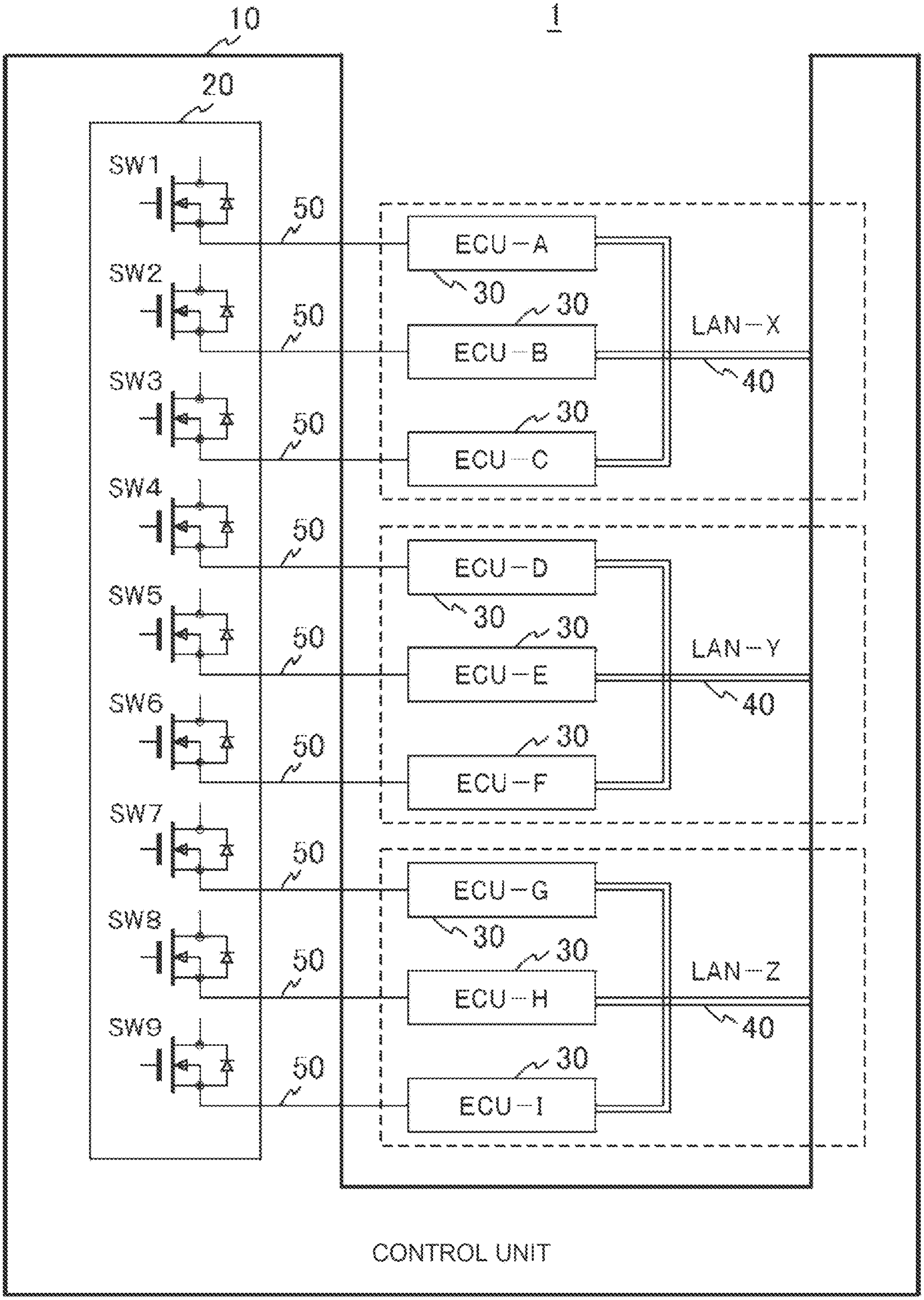
FIG. 1 is a schematic configuration diagram of an abnormality determination system according to an embodiment of the present disclosure.

FIG. 1 is a schematic diagram illustrating a configuration of an abnormality determination system 1 according to an embodiment of the present disclosure. The abnormality determination system 1 illustrated in FIG. 1 includes a control unit 10 and a plurality of electronic control units 30. The abnormality determination system 1 is mounted on a vehicle such as an automobile.

The control unit 10 is connected to the plurality of electronic control units 30 and is configured to determine abnormality in the plurality of electronic control units 30. The control unit 10 is typically configured as an electronic control unit (ECU: Electronic Control Unit) including a processor, memories, input/output interfaces, and the like.

The control unit 10 is communicably connected to a plurality of electronic control units 30 via two or more communication buses 40. The communication bus 40 is an in-vehicle network such as a controller area network (CAN), for example. In the present embodiment, the control unit 10 is connected to ECU-A, ECU-B and ECU-C of the plurality of electronic control units 30 via a LAN-X that is one of the communication buses 40. The control unit 10 is connected to ECU-D, ECU-E and ECU-F of the plurality of electronic control units 30 via a LAN-Y that is one of the communication buses 40. The control unit 10 is connected to ECU-G, ECU-H and ECU-I of the plurality of electronic control units 30 via a LAN-Z that is one of the communication buses 40.

Further, the control unit 10 includes a power supply ECU 20 for controlling a power-supply status (ON/OFF of power supply) from a predetermined power supply to the plurality of electronic control units 30. The power supply ECU 20 includes a SW1, SW2, SW3, SW4, SW5, SW6, SW7, SW8 and a SW9. SW1 is a switch for controlling the power ON/OFF of ECU-A of the electronic control unit 30. SW2 is a switch for controlling the power ON/OFF of ECU-B of the electronic control unit 30. SW3 is a switch for controlling the power ON/OFF of ECU-C of the electronic control unit 30. SW4 is a switch for controlling the power ON/OFF of ECU-D of the electronic control unit 30. SW5 is a switch for controlling the power ON/OFF of ECU-E of the electronic control unit 30. SW6 is a switch for controlling the power ON/OFF of ECU-F of the electronic control unit 30. SW7 is a switch for controlling the power ON/OFF of ECU-G of the electronic control unit 30. SW8 is a switch for controlling the power ON/OFF of ECU-H of the electronic control unit 30. SW9 is a switch for controlling the power ON/OFF of ECU-I of the electronic control unit 30. Examples of the plurality of switches SW1 to SW9 include a semiconductor-power switch such as an intelligent power device (IPD). Switches SW1 to SW9 are connected to ECU-A to ECU-I of the electronic control units 30 by dedicated power lines 50, respectively.

Further, the power supply ECU 20 can measure (acquire) the current flowing from each ECU-A of the electronic control unit 30 connected to SW9 to ECU-I from each switching SW1. The measured current value includes not only the current value consumed by the electronic control unit 30 to be measured but also the current value consumed by a load or the like (not shown) connected downstream of the electronic control unit 30.

The plurality of electronic control units 30 are devices mounted on the vehicle. Among the plurality of electronic control units 30, one having a network management (NM) function is included. This NM function is capable of controlling (requesting) the activation (Wakeup) and deactivation (Sleep) of a particular electronic control unit 30 or network by sending a NM message to the communication bus 40. In the present embodiment, it is assumed that ECU-F from ECU-A of the electronic control unit 30 has a NM function.

NM function also includes a control unit 10. The control unit 10 can detect (grasp) which communication buses 40 are requesting to be activated via NM messaging.

Control

Figure 2:
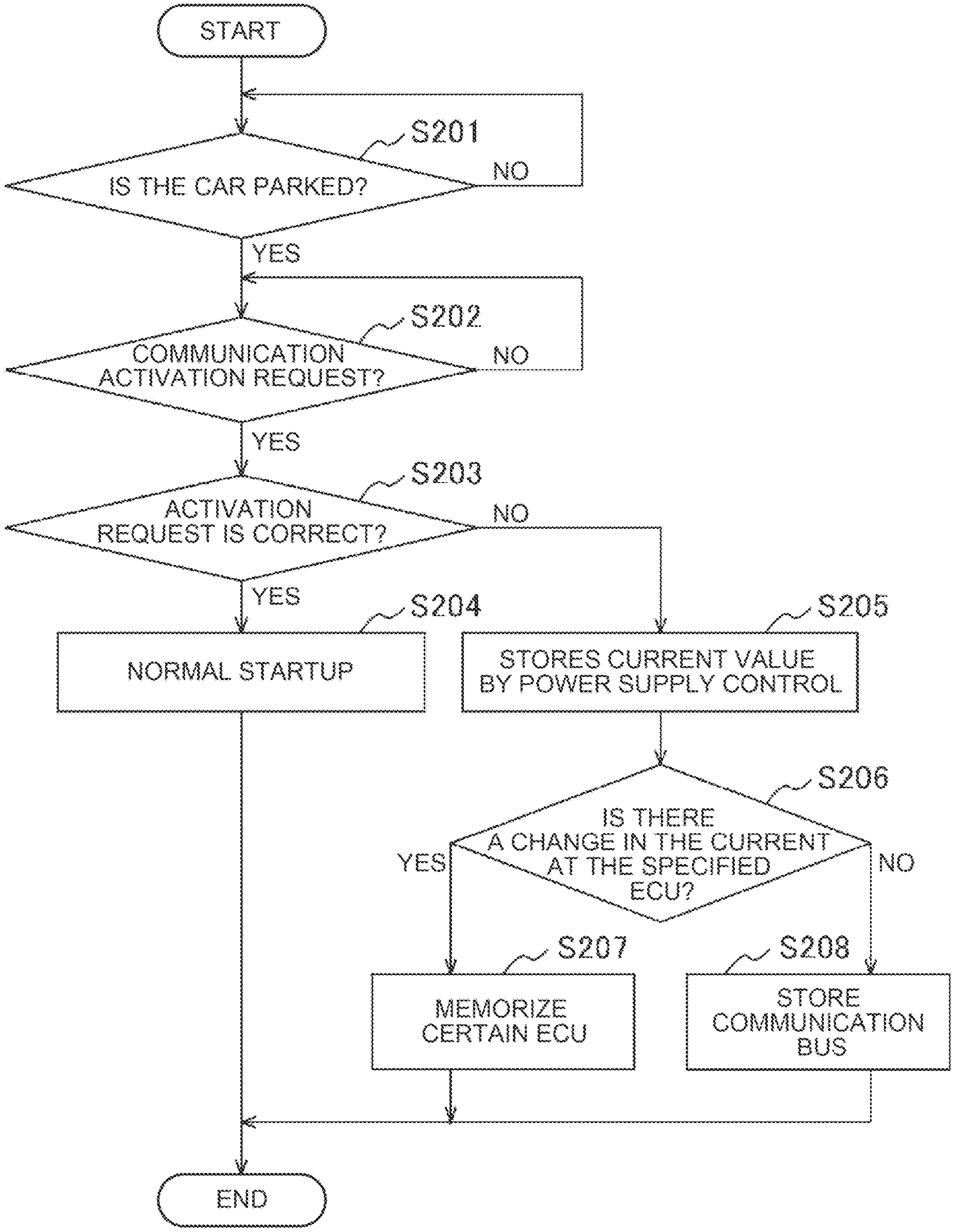
FIG. 2 is a processing flowchart illustrating abnormality determination control executed by the abnormality determination system.

Next, the control performed by the abnormality determination system 1 will be described with reference to FIG. 2. FIG. 2 is a flowchart illustrating a processing procedure of abnormality determination control executed by the control unit 10 of the abnormality determination system 1.

S201

The control unit 10 determines whether or not the vehicle is parked. This means that the electronic control unit 30 is in a Sleep state in which communication is stopped. If the vehicle is parked (S201, Yes), the process proceeds to S202. On the other hand, if the vehicle is not parked (S201, No), it waits until the vehicle is parked.

S202

The control unit 10 determines whether or not there is a communication activation request from the plurality of electronic control units 30 or the like via the communication bus 40. If there is a communication activation request (S202, Yes), the process proceeds to S203. On the other hand, if there is no request to activate communication (S202, No), it waits until there is a request to activate communication.

S203

When there is a communication activation request, the control unit 10 determines whether the communication activation request is correct. This determination is made by the activation request sent from the communication bus 40 to which the electronic control unit 30 having NM function is connected, or the activation request sent from the electronic control unit 30 that is powered ON, in which the activation request of the communication is supposed to be sent. If it is determined that the request to start the communication is correct (S203, Yes), the process proceeds to S204. On the other hand, if it is determined that the request to activate the communication is not correct (S203, No), the process proceeds to S205.

S204

The control unit 10 activates the target electronic control unit 30 and the network based on the communication activation request (normal activation). When the normal activation is executed by the control unit 10, this abnormality determination control ends.

S205

The control unit 10 performs predetermined power supply control by the power supply ECU 20 without performing normal activation, and stores the current flowing through the plurality of electronic control units 30 that can be measured by the power supply control. The predetermined power supply control will be described later. When the control unit 10 stores the current obtained by the power supply control, the process proceeds to S206.

In a case where the control unit 10 does not execute the normal activation, if it is an unauthorized access from the outside of the vehicle, the occurrence of an abnormality may be notified by blinking of the light, sounding of the buzzer, or the like. In addition, the surroundings of the vehicle may be recorded using a surrounding monitoring camera or an indoor camera. In addition, the storage of the communication log may be started (whether a signal different from the signal registered at the time of design is generated, whether the signal is the same as the registered signal but there is an abnormality in the communication cycle, etc.). Also, a series of data may be uploaded to the server and notified to the owner of the vehicle. In addition, a PIN code-entry or biometric authentication may be requested at the time of starting the vehicle.

S206

The control unit 10 analyzes the current value measured by S205, and determines whether or not there is a particular electronic control unit 30 that changes the current value among the plurality of electronic control units 30. More specifically, the control unit 10 determines whether or not the current value after the power supply control is performed is changed (increased or decreased) with respect to the current value before the power supply control is performed. If there is a particular electronic control unit 30 for changing the current (S206, Yes), the process proceeds to S207. On the other hand, if there is no particular electronic control unit 30 for changing the current (S206, No), the process proceeds to S208.

S207

The control unit 10 determines that a specific electronic control unit 30 for changing the current value is a cause of occurrence of abnormality, and stores information of the specific electronic control unit 30 in a predetermined storage unit or the like. At this time, the control unit 10 may store the information of the communication bus 40 to which the specific electronic control unit 30 is connected together. When the information of the specific electronic control unit 30 is stored, the abnormality determination control ends.

S208

The control unit 10 determines that the cause of the occurrence of the abnormality is not the regular electronic control unit 30 mounted on the vehicle but an unknown device connected to the outside, and stores the information of the communication bus 40 to which the activation request is sent in a predetermined storage unit or the like. When the information of the communication bus 40 to which the start request has been sent is stored, this abnormality determination control ends.

Examples

1. Case 1

Figure 3:
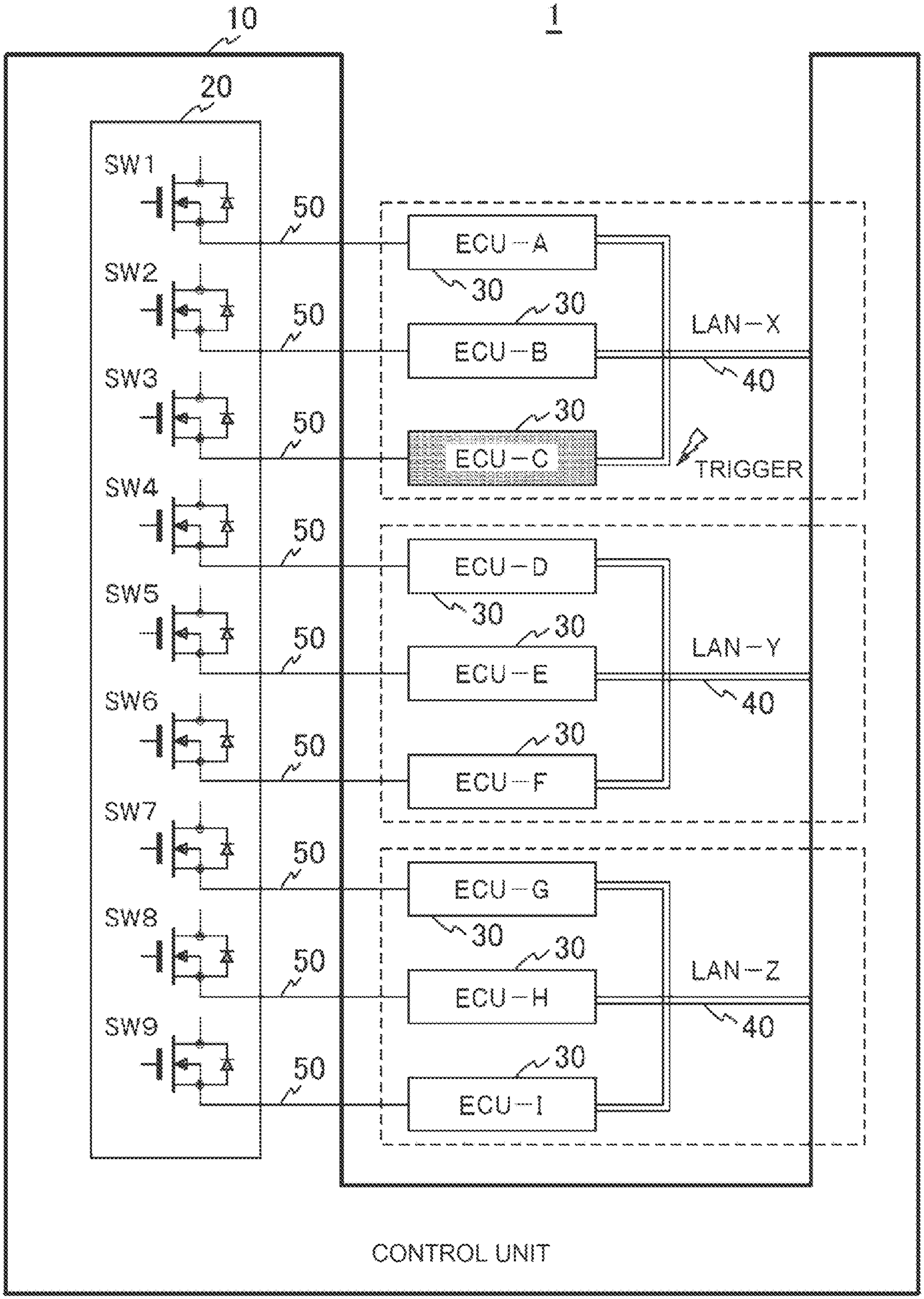
FIG. 3 is a diagram for explaining a state of the case 1 of the abnormality determination system.

FIG. 3 is a diagram illustrating a case in which a trigger of an activation request is sent from ECU-C to the control unit 10 when ECU-C is Sleep in a NM messaging when ECU-A and ECU-B of the electronic control unit 30 are in the power OFF and ECU-C is in the power ON (shaded in the drawing).

In this case 1, since LAN-X is the normal communication bus 40 and ECU-C is in the power ON that can trigger the activation request, it is determined that the operation is normal. Therefore, normal activation is performed (S204 of FIG. 2).

2. Case 2

Figure 4:
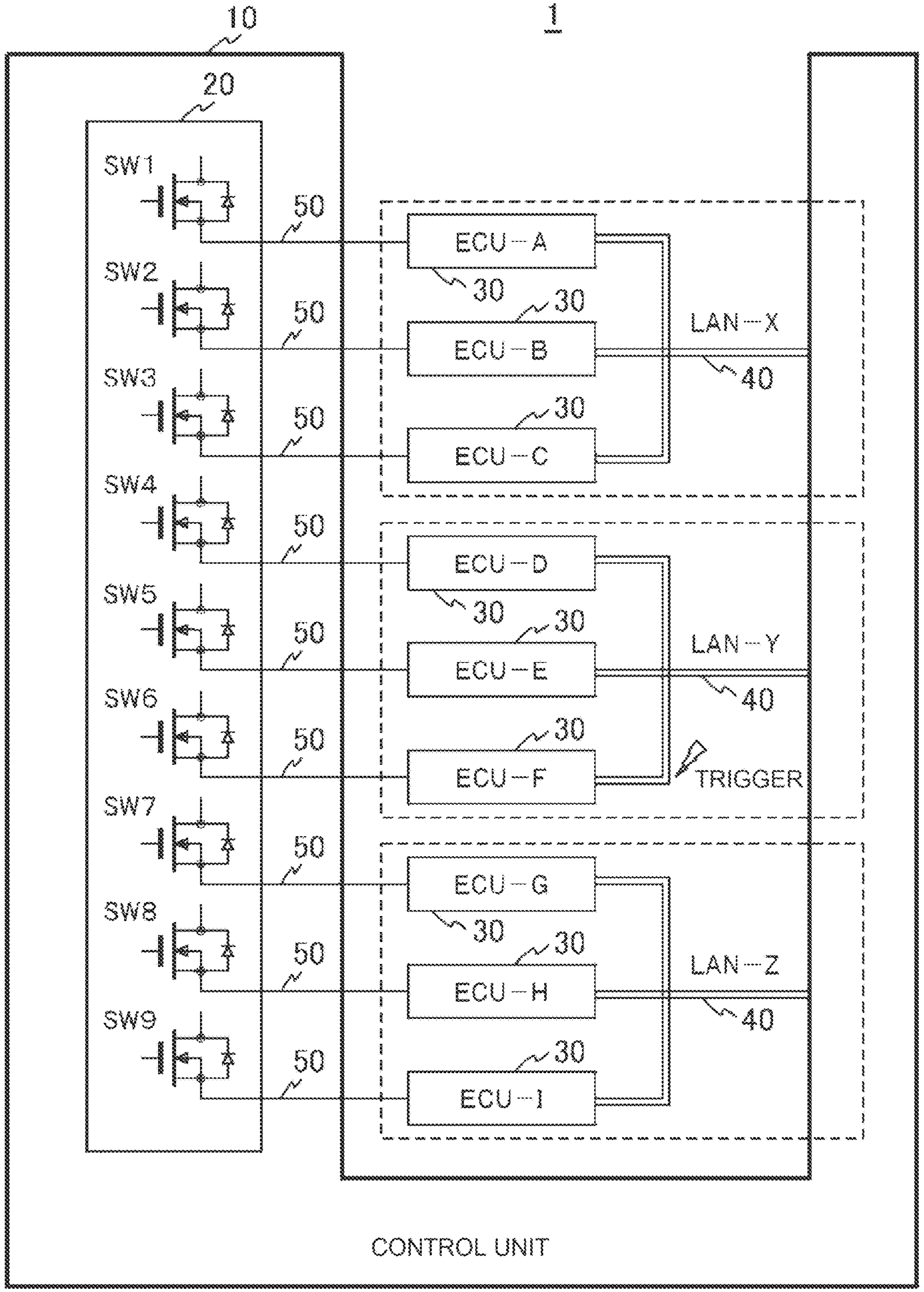
FIG. 4 is a view for explaining the status of the case 2 of the abnormality determination system.

FIG. 4 is a diagram illustrating a case where a trigger of an activation request is sent to LAN-Y of the communication bus 40 when ECU-D, ECU-E of the electronic control unit 30 and all of ECU-F are powered OFF (communication is not performed).

In this case 2, although LAN-Y is the regular communication bus 40, it is determined that the motion is abnormal because not all of ECU-D, ECU-E, and ECU-F are capable of triggering the activation request (communication cannot be performed). In this case, the control unit 10 performs the following power supply control to confirm the change in the current value.

First, the current value i1 at which the trigger of the activation demand is issued is measured. Next, the current i2 of each of the plurality of electronic control units 30 when the electronic control unit 30 that is the power ON is turned OFF one by one is measured. Next, a change in the current value i2 after the power supply control is performed with respect to the current value i1 prior to the power supply control is checked. Then, the electronic control unit 30 that is turned OFF when the current value i2 changes with respect to the current value i1 determines that the device is in an abnormal state, and stores the electronic control unit 30 (S207 in FIG. 2). On the other hand, if the current value i2 does not change with respect to the current value i1 even if all of the plurality of electronic control units 30 are controlled to the power OFF, it is determined that a device that cannot control the power supply by the power supply ECU 20 may be connected to LAN-Y of the communication bus 40. Then, LAN-Y is stored (S208 in FIG. 2).

3. Case 3

Figure 5:
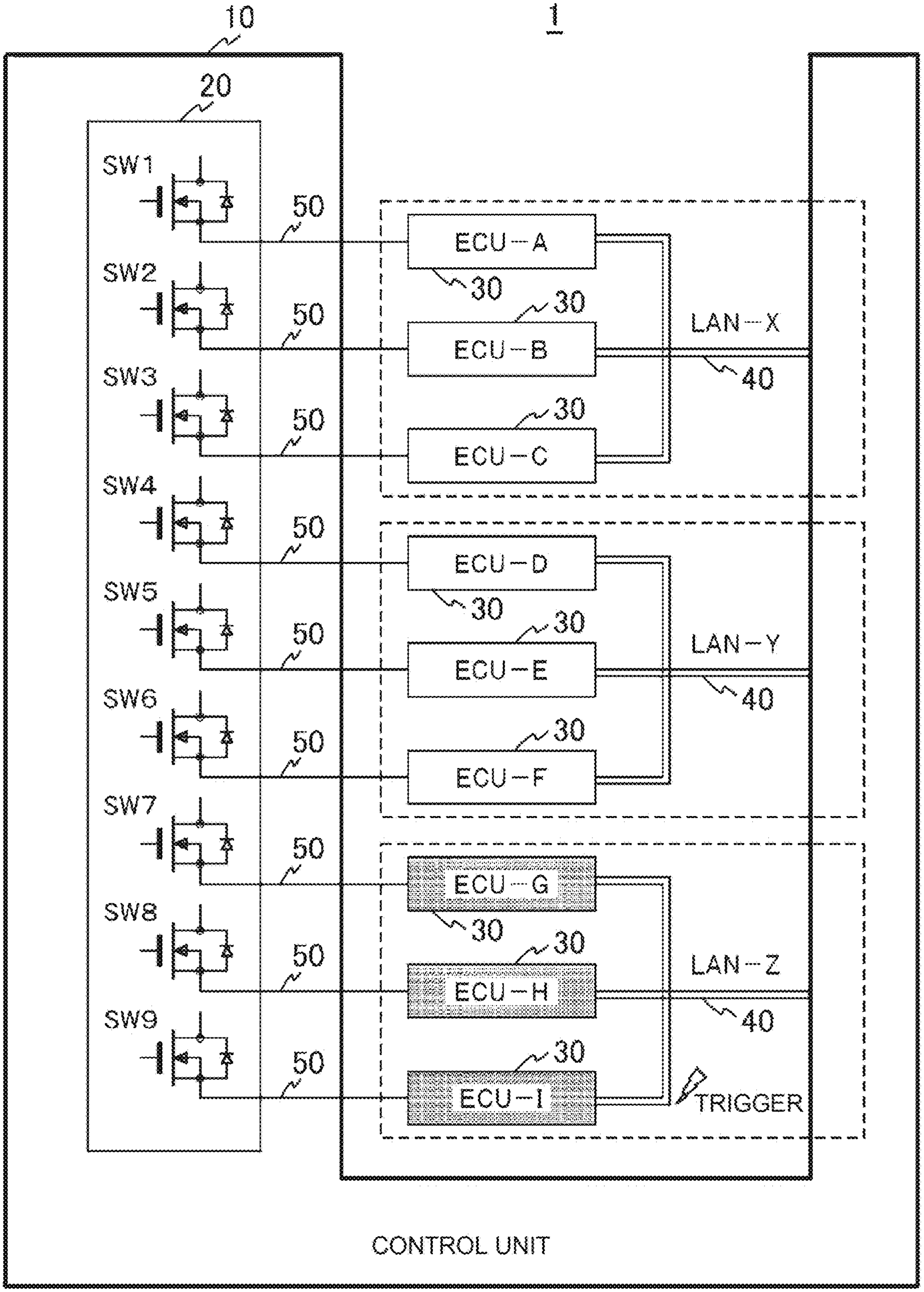
FIG. 5 is a diagram for explaining a state of the case 3 of the abnormality determination system.

FIG. 5 is a diagram illustrating a case where a trigger of an activation request is sent to LAN-Z of the communication bus 40 when all of ECU-G, ECU-H, and ECU-I of the electronic control unit 30 are in Sleep state in NM messaging when all of ECU-G, ECU-H, and ECU-I are in the power ON.

In this case 3, ECU-G, ECU-H and ECU-I are all electronic control units 30 that are unable to trigger the activation demand (have no NM function), and thus are determined to be abnormal movements. In this case, the control unit 10 determines that there is a possibility that a device that cannot control the power supply by the power supply ECU 20 is connected to LAN-Z of the communication bus 40, and stores LAN-Z to which the trigger of the activation request is sent (S208 in FIG. 2). At this time, ECU-G, ECU-H connected to LAN-Z and the power status (ON/OFF) of ECU-I may be stored together. In the case of the case 3, the above-described power supply control may not be performed.

4. Case 4

As a method of unauthorized access, it is conceivable to send a false start-up request to a communication bus 40 (for example, a LAN-X) that is easy to access from outside the vehicle, using an external tool or the like. As a countermeasure in this case, starting from the originally designated communication bus 40 is performed, followed by starting flow such as monitoring of power supply, network, and control. This normal start-up flow is as follows.

As a parking state, a network of vehicles including the control unit 10 is in a Sleep state. In this Sleep condition, when a legitimate electronic key approaches the vehicle, the network is activated. After the network is activated, the control unit 10 is activated next. The activated control unit 10 monitors the designated LAN-Y (the communication bus 40 is difficult to be accessed from outside the vehicle). If the monitoring of LAN-Y is satisfactory, the control unit 10 controls ECU-D, ECU-E and ECU-F of the electronic control unit 30 to be turned ON to start up. Then, the control unit 10 performs security confirmation on the activated ECU-D, ECU-E and ECU-F.

By stepping on such a startup flow, it can be determined that the startup request is abnormal even if, for example, a startup request is generated on LAN-X due to unauthorized access in a Sleep condition of the network. That is, since it is an activation request from a LAN-X that does not originally issue an activation request through communication, it can be determined that this activation request is abnormal. Therefore, the activation request is rejected. Further, for example, even when a security-release request or a guidance request is generated in a state in which ECU-D, ECU-E and ECU-F are not moving (power OFF), the request can be disabled.

As described above, by selectively using a point that is relatively easy to access and a point that is difficult to access, it is possible to improve the level of security physically (spatially). Furthermore, by complicating the processing sequence, the difficulty of access in time can also be increased.

Operations and Effects

As described above, according to the abnormality determination system 1 according to the embodiment of the present disclosure, when there is an abnormal start request via the communication bus 40 while the vehicle is parked, the power supply control for switching the power supply state to the plurality of electronic control units 30 is performed. Then, the change (i1-i2) of the current flowing through the plurality of electronic control units 30 before and after the power supply control is measured. When there is a specific electronic control unit 30 for changing the current value, the information of the specific electronic control unit 30 is stored, or when there is no electronic control unit 30 for increasing the current value, the information of the communication bus 40 that has received the start request is stored. By this control, when an abnormality occurs in the vehicle, the electronic control unit 30 or the communication bus 40 in which the abnormality occurs can be easily identified.

The abnormality determination system of the present disclosure can be used, for example, in a case where it is desired to determine an abnormality of an electronic control unit mounted in a vehicle.

What is claimed is:

1. An abnormality determination system that determines an abnormality of an electronic control unit mounted on a vehicle, the abnormality determination system comprising:
   electronic control units; and
   a processor connected to one or more of the electronic control units via a first communication bus and connected to one or more of the electronic control units via a second communication bus, wherein the processor is configured to:
      in response to an activation request via the first communication bus, the second communication bus, or both the first communication bus and the second communication bus while the vehicle is parked:
         before performing a predetermined power supply control, measure values of currents that flow through the one or more of the electronic control units connected to the first communication bus, flow through the one or more of the electronic control units connected to the second communication bus, or flow through any combination of the one or more electronic control units connected to the first communication bus or the second communication bus,
         perform the predetermined power supply control for the one or more of the electronic control units connected to the first communication bus, the one or more of the electronic control units connected to the second communication bus, or any combination of the one or more electronic control units connected to the first communication bus or the second communication bus, and
         after performing the predetermined power supply control, measure values of currents that flow through the one or more of the electronic control units connected to the first communication bus, flow through the one or more of the electronic control units connected to the second communication bus, or flow through any combination of the one or more electronic control units connected to the first communication bus or the second communication bus,
      if there is a specific electronic control unit of the one or more of the electronic control units connected to the first communication bus, the one or more of the electronic control units connected to the second communication bus, or any combination of the one or more electronic control units connected to the first communication bus or the second communication bus for which the measured values of current have changed, store information on the specific electronic control unit, and
      if there is no electronic control unit of the one or more of the electronic control units connected to the first communication bus, the one or more of the electronic control units connected to the second communication bus, or any combination of the one or more electronic control units connected to the first communication bus or the second communication bus for which the measured values of current have changed, store information on the first communication bus, the second communication bus, or both the first communication bus and the second communication bus that received the activation request, wherein:
   the processor performs, as the predetermined power supply control, control in which the one or more of the electronic control units connected to the first communication bus, the one or more of the electronic control units connected to the second communication bus, or any combination of the one or more electronic control units connected to the first communication bus or the second communication bus are turned off one by one; and
   a value of current flowing through each electronic control unit is measured after each corresponding electronic control unit has been turned off.

2. An abnormality determination system that determines an abnormality, the abnormality determination system comprising:
   a first electronic control unit and a second electronic control unit mounted on a vehicle; and
   a processor connected to the first electronic control unit and the second electronic control unit via a first communication bus, wherein the processor is configured to:
      in response to an activation request while the vehicle is parked:
         measure a first value of current flowing through the first electronic control unit and through the second electronic control unit before performing a predetermined power supply control,
         perform the predetermined power supply control for the first and second electronic control units, and
         measure a second value of current flowing through the first electronic control unit and through the second electronic control unit after performing the predetermined power supply control,
      if the first value of current and the second value of current flowing through the first electronic control unit are different, the first value of current and the second value of current flowing through the second electronic control unit are different, or both the first value of current and the second value of current flowing through the first electronic control unit are different and the first value of current and the second value of current flowing through the second electronic control unit are different, store information on the first electronic control unit, the second electronic control unit, or both the first electronic control unit and the second electronic control unit for which the first value of current and second value of current are different, and
      if the first value of current and the second value of current of the first electronic control unit are the same and the first value of current and the second value of current of the second electronic control unit are the same, store information on the first communication bus, wherein:
   the processor performs, as the predetermined power supply control, control in which the first and second electronic control units are turned off one by one;
   the second value of current flowing through the first electronic control unit is measured after the first electronic control unit has been turned off; and the second value of current flowing through the second electronic control unit is measured after the second electronic control unit has been turned off.

3. The abnormality determination system according to claim 2, wherein the activation request is via the first communication bus.

4. The abnormality determination system according to claim 2, wherein the activation request is via a second communication bus different than the first communication bus.

5. The abnormality determination system according to claim 2, wherein the predetermined power supply control is performed when the processor determines that the activation request should not be performed.

* * * * *